Dec. 6, 1966  S. A. D'ALESSIO ET AL  3,290,204
LAMINATED PANELS AND THEIR METHOD OF PRODUCTION
Filed April 23, 1963  3 Sheets-Sheet 1

INVENTORS
STEPHEN A. D'ALESSIO
PHILIP A. D'ALESSIO
BY
ATTORNEY.

Dec. 6, 1966  S. A. D'ALESSIO ETAL  3,290,204
LAMINATED PANELS AND THEIR METHOD OF PRODUCTION
Filed April 23, 1963  3 Sheets-Sheet 2

INVENTORS
STEPHEN A. D'ALESSIO
PHILIP A. D'ALESSIO
BY
ATTORNEY

Dec. 6, 1966  S. A. D'ALESSIO ETAL  3,290,204
LAMINATED PANELS AND THEIR METHOD OF PRODUCTION
Filed April 23, 1963  3 Sheets-Sheet 3

INVENTORS
STEPHEN A. D'ALESSIO
PHILIP A. D'ALESSIO
BY
Joseph R. Green
ATTORNEY

United States Patent Office 3,290,204
Patented Dec. 6, 1966

3,290,204
LAMINATED PANELS AND THEIR METHOD
OF PRODUCTION
Stephen Anthony D'Alessio, 209—02 43rd Ave., and
Philip A. D'Alessio, 4019 207th St., both of Bayside,
Queens, N.Y.
Filed Apr. 23, 1963, Ser. No. 275,029
10 Claims. (Cl. 161—43)

This invention relates generally to laminated panels and more particularly to panels having decorative surface laminations, together with an improved process of forming the same.

As used hereinthroughout, the term "panel" means a relatively thin slab, the upper and lower surfaces of which may be flat or smoothly curved. At least one edge of the "panel" is smoothly rounded. Where either surface is curved, then that surface is smoothly continuous with the surface of the rounded edge and both form part of a lateral cylindrical surface capable of being generated by a single generatrix.

There has been widespread public acceptance of articles of manufacture having sheets of decorative plastic as their permanently bonded surface laminations. Their attractiveness, durability and imperviousness to the effects of normal household temperatures and of water, grease, glue and like fluids have been factors which have tended to increase their public demand. Some of the more attractive plastic sheets, such as the melamine or the polyester resin decorative laminates require the controlled application of heat in order to be formed into curved or nonplanar surfaces. This has resulted in the disadvantages of requiring the use of pre-formed segments of these decorative laminates which are then bonded to their bases, or of leaving raw edges, undesirably conspicuous margins or unattractive lines of demarcation within which unsightly particles may accumulate.

It is therefore an object of this invention to provide panels having durable and decorative plastic surface laminations bonded thereto, the said laminations being continuous and marginless around any preselected rounded edge or curved surface, thereby maintaining an attractive, integral appearance.

A closely related object of this invention is to provide a quick and inexpensive, but nevertheless effective process for the formation of panels with durable and decorative plastic surface laminations as described herein.

A further object of this invention is to provide a process for the formation of panels of the type described, which is so simple that it can be used effectively by the average workman whose experience in the field is rather limited.

Still further objects and incidental advantages will appear to persons skilled in the art to which this invention pertains as the description proceeds both by direct recitation thereof and by implication from the text.

In accordance with the invention, therefore, an article of manufacture is provided which has as its central core a panel with at least one rounded edge, and top and bottom surfaces which may be flat or smoothly cylindrically curved as defined hereinbefore. A decorative sheet is bonded to the core in integral continuity over the top surface, the rounded edge and the bottom surface thereof. Further, in accordance with the invention, the process of forming the said article of manufacture is provided whereby a bonding element is applied to the central core and to the decorative surface sheet, the sheet is adhered to one surface of the core, heat is selectively applied to that portion of sheet which is to be adhered to the rounded edge of the core, the sheet is adhered to the rounded edge and to the other surface of the core, and pressure is applied firmly to adhere the surface lamination to the core.

In describing the invention, reference will be made to the accompanying drawings in which the same or similar reference characters will be used to indicate the same or similar parts.

Figure 12:
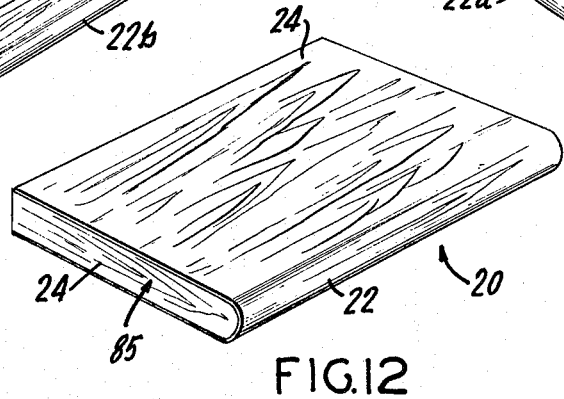
FIGURES 12 is a perspective view of the laminated panel with a bevelled, laminated edge.

Referring now more particularly to the drawings, FIGURE 12 illustrates one embodiment of the invention, a panel 20 having a smoothly rounded edge 22 and a decorative surface lamination 24. The central core 26 may be made of wood, plywood, cardboard or of any material of sufficient density and firmness to be suitable for the purpose for which it is intended. A panel of the general conformation shown in FIGURE 12 might be suitable for a shelf, a desk leaf, a bandrail, a chair seat and the like.

Although the embodiment shown in FIGURE 12 has upper and lower surfaces which are substantially flat and parallel, they may be smoothly curved. They should, however, be such that they may be geometrically described as cylindrical surfaces. The rounded edge should be convex, substantially semicircular in cross section, and tangent to the upper and lower surfaces.

The surface lamination 24 may be a sheet of any material which requires the application of heat in order to bend it into a preselected curve. Either polyester resin or melamine decorative laminates which are capable of forming to a minimum radius of three-eighths of an inch have been found to be suitable. The polyester resin laminate may be a laminate composed of two or more sheets of paper, such as decorative sheet and core sheet, impregnated with polyester resins. The melamine decorative laminates are formed in thin sheets with the melamine impregnated or deposited upon a flexible base, the melamine being in a semi-cured state. Such products are readily available under trade names such as Conolite and Formica as well as others.

In the process of manufacturing a decoratively laminated panel 20, according to the invention, a central core panel with a smoothly rounded edge 28 of the type hereinbefore described is used. A smoothly rounded edge is formed on the core if the core does not already have one. The surfaces are sanded for smoothness if necessary. Superfluous surface particles may be removed by a stream of air under pressure. The surfaces of the central core 26 and the undersurface of the surface lamination are coated with glue 48. A quick drying contact cement containing drying resins, neoprene rubber and aromatic solvents, such as manufactured by Columbia Cement Company, Inc., Brooklyn, New York, and marketed as Con-Bond 773–40P, and which does not break down below 180 degrees Fahrenheit has been found to be effective. The glue is heated and sprayed onto the surfaces of the core and of the decorative laminate which are to be bonded. Heating the glue to a temperature of about 155 degrees Fahrenheit has been found to be effective in vaporizing the solvents to accelerate the drying process and in lowering its viscosity to make the spraying process easier.

Figure 3:
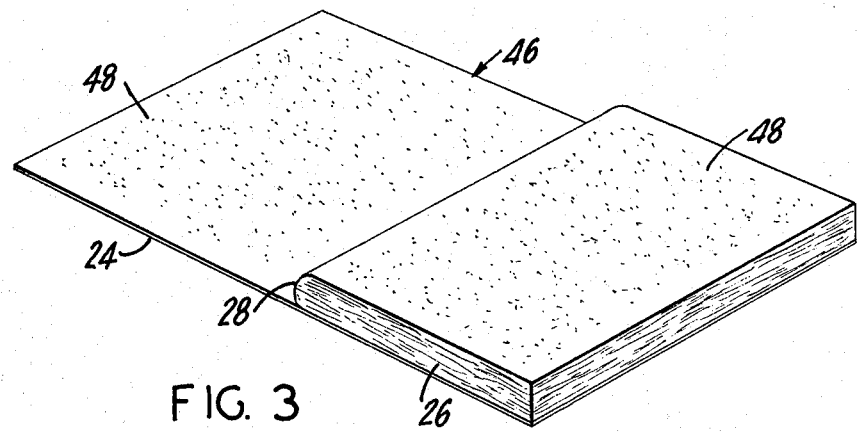
FIGURE 3 is a perspective view of a panel to one surface of which has been adhered a decorative sheet of surface lamination.

When the glue has dried sufficiently for bonding purposes, one surface of the core panel, which is here called the lower surface, is adhered to the undersurface of the decorative laminate and smoothed in place with part of the sheet of decorative laminate extending beyond, but not adhering to the rounded edge 28 as shown in FIGURE 3.

Figure 1:
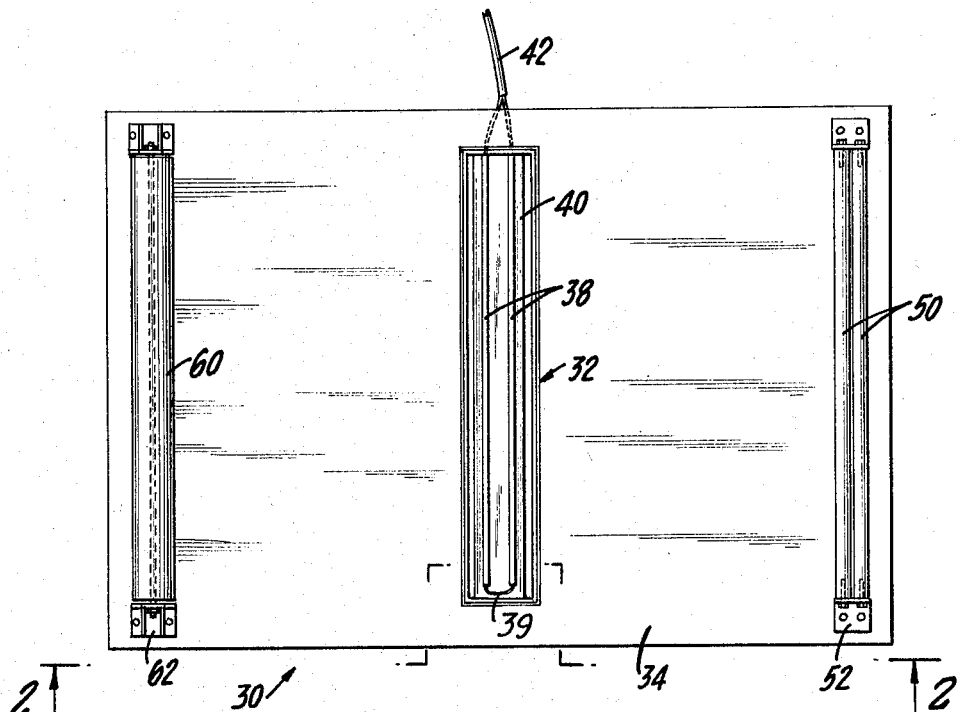
FIGURE 1 is a top plan view of a work table illustrating some of the apparatus which may be used in the process of forming the articles of manufacture provided by this invention.
Figure 2:
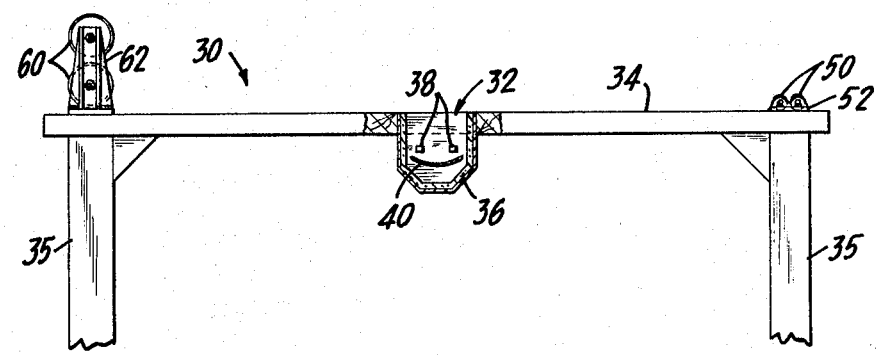
FIGURE 2 is an elevation, partially in section, taken along the lines 2—2 of FIGURE 1.

One way of accomplishing this stage of the process of manufacture is to place the sheet of decorative laminate on the top 34 of a work table 30 such as is shown in FIGURES 1 and 2, glue-covered side up. Supporting legs 35 are of a length to give comfortable working elevation. The glue-covered core is then placed on the laminate as shown in FIGURE 3. If the decorative laminate is in the form of a precut sheet 46, care should be exercised to place the core and the pre-cut sheet in registry. Sheets pre-cut exactly to size are not necessary, however, as the edges of the sheet may easily be trimmed to fit.

That portion of the laminate which is to be adhered to the rounded edge is then heated preparatory to being formed and adhered. A simple way to accomplish the heating process is to use an elongated heating well 32 which is sunk into the work table top 34. Elongated electric heating elements 38 having an interconnection 39 are backed by a crescent heat reflector 40 and are longitudinally mounted within the well. They furnish heat which is concentrated and directed. Power for the heating elements may be furnished by a commercial power supply through the cable 42. The asbestos wall 36 provided heat protection.

Figures 4, 5:
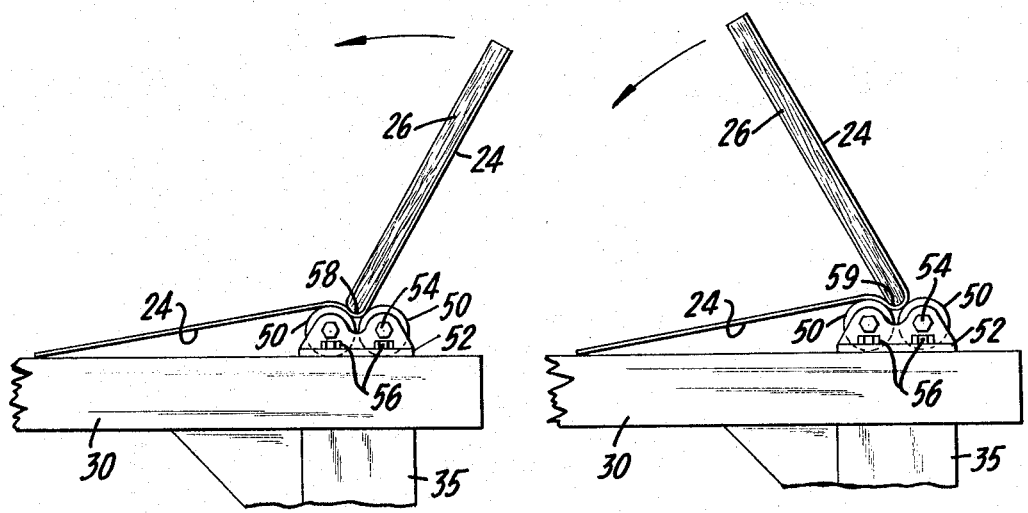
FIGURES 4 and 5 are partial elevations of the work table shown in FIGURES 1 and 2 and illustrate the sheet of decorative surface lamination in two stages of the process of being worked into smooth, close adherence to the rounded edge of the core panel.

The rounded edge is then tightly rolled over the somewhat softened portion of the sheet of decorative laminate. One very effective way of accomplishing this stage of the process of manufacture is illustrated in FIGURES 4 and 5. The rounded edge may be firmly rolled in the sharply concave space between the longitudinally substantially adjacent dowels 50 which are bolted to the dowel brackets 52 by bolts 54. The dowel brackets are bolted to the table by bolts 56. Dowel contact positions 58 and 59 assist in obtaining a close fit as the rounded edge is rolled between the dowels.

If the panel has another rounded edge on the side opposite the first rounded edge, then the decorative laminate may be adhered to the other rounded edge in a manner similar to that hereinbefore described.

Figures 6, 7:
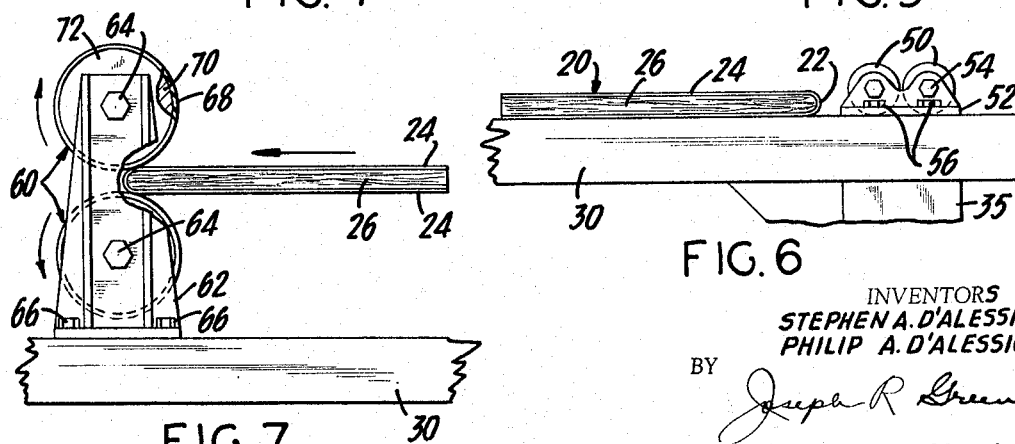
FIGURE 6 is a partial elevation of the work table shown in FIGURES 1 and 2 and illustrates the core panel to which has been adhered a sheet of decorative surface lamination.
FIGURE 7 is a partial elevation of the work table shown in FIGURES 1 and 2 and illustrates one way of applying even pressure to the surfaces of the laminated panel by means of pressure rollers to ensure a smooth, close adherence of the decorative sheet to the core panel.

The other surface, which shall be termed the upper surface, of the core is then smoothly adhered to the sheet of decorative laminate. This may be done by simply rolling the panel over the rounded edge to lie flat on the work table as is shown in FIGURE 6.

To ensure a close, smooth, overall fit and to eliminate any air bubbles which may have formed in the space between the central core and the surface lamination pressure is evenly applied. A preferred way of doing this is to guide the laminated panel between pressure rollers such as are shown in FIGURE 7. The pressure rollers 60 are mounted within the brackets 62 by means of bolts 64. Bolts 66 fix the brackets 62 to the work table. The rolling surfaces 68 may be somewhat resilient but should be firmly backed by a dense core 70. The side edges of the rollers may be covered by metal caps 72.

Figure 8:
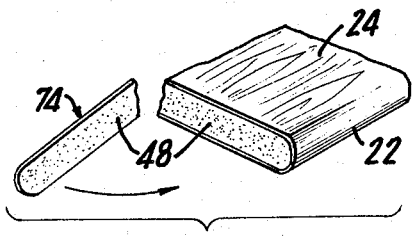
FIGURE 8 is a perspective view of a laminated panel and shows a strip of decorative surface lamination about to be adhered to a side edge of the panel.
Figure 9:
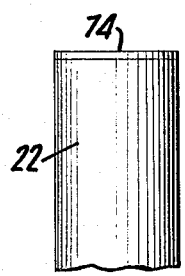
FIGURES 9 and 10 are partial end views of the laminated panel, facing the rounded edge thereof.
Figure 10:
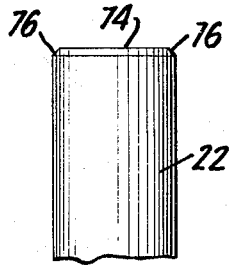
Figure 11:
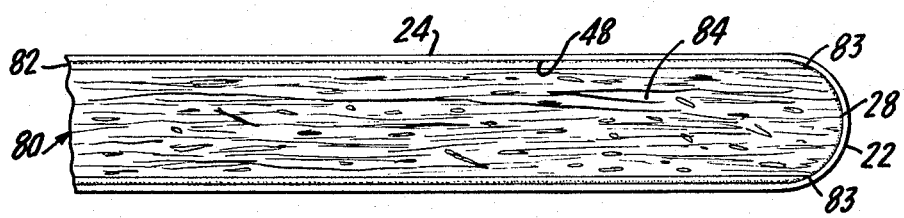
FIGURE 11 is a partial side view of the laminated panel showing an alternative form of laminated core.

The ends of the laminated panel may be left uncovered. One such end 84 is shown in FIGURE 11. However, it is usually desirable to cover the ends 85, 88 and 94 with strips of decorative laminate. A pre-cut strip 74 may be bonded to the end edge of a core panel by applying glue to the surfaces to be bonded as shown in FIGURE 8 and then adhering the strip smoothly to the edge of the core. Impact pressure may then be used to obtain a tight fit. To improve the appearance of a panel having flat end edges covered with a decorative laminate the linear edges 76 may be bevelled and stained.

Sometimes the central core panel itself is laminated to increase its strength. Such a laminated core 80 is shown in FIGURE 11 in which the core lamination is shown as terminating at 83 at approximately where the rounded edge is tangent to the upper surface and to the lower surface.

Figure 13:
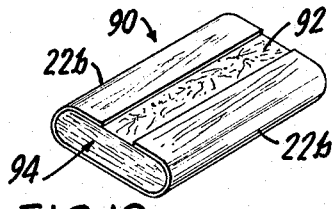
FIGURE 13 is a perspective view of a laminated panel having two rounded edges and shown bottom side up.
Figure 14:
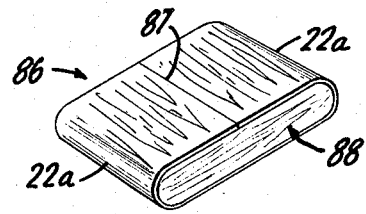
FIGURE 14 is a perspective view of another embodiment of a laminated panel having two rounded edges and shown bottom side up.

The complete wrap of a panel 86 in a decorative laminate is shown in FIGURE 14. Even though the panel shown has two rounded edges 22a, only one seam 87 is necessary. This seam may be hidden from sight by positioning it on the under surface of the panel. Where the under surface of a panel 90 is not exposed to view, as may be the case where the panel is used as a desk top with two rounded edges 22b, then part 92 of the hidden surface may be left uncovered by a decorative laminate, as shown in FIGURE 13.

The aesthetic appeal of panels having decorative surface laminations has resulted in widespread demand. An improved article of manufacture to meet this demand for such panels, which may be free standing or components of other articles of manufacture, together with an improved process for producing the same, is herein provided.

What is claimed is:

1. An article of manufacture comprising a central core panel formed with at least one convex, smoothly rounded edge and having an upper substantially flat surface and a lower substantially flat surface, the said rounded edge being tangential to the said upper and lower surfaces, and a continuous sheet of decorative lamination bonded to the lower surface, to the rounded edge and to the upper surface of the said core panel.

2. An article of manufacture comprising a central core panel formed with at least one convex, smoothly rounded edge and having an upper surface and a lower surface, the said rounded edge being tangential to the said upper and lower surfaces, a continuous sheet of decorative laminate closely adhering to the lower surface, to the rounded edge and to the upper surface of the said core panel, and a layer of pressure contact cement between the said core panel and the continuous sheet of decorative laminate.

3. An article of manufacture comprising a flat central core panel formed with at least one convex, smoothly rounded edge and having an upper surface and a lower surface, the said rounded edge being tangential to the said upper and lower surfaces, and a continuous sheet of decorative laminate bonded to the lower surface, to the rounded edge and to the upper surface of the said core panel.

4. An article of manufacture comprising a flat, substantially rectangular central core panel formed with at least one convex, smoothly rounded edge and having an upper surface and a lower surface, the said rounded edge being tangential to the said upper and lower surfaces, and a continuous sheet of decorative laminate bonded to the lower surface, to the rounded edge and to the upper surface of the said core panel.

5. An article of manufacture comprising a flat, substantially rectangular central core panel formed with two of its opposite edges convex and smoothly rounded and having an upper surface and a lower surface, the said rounded edges being tangential to the said upper and lower surfaces, and a continuous sheet of decorative laminate bonded continuously to a portion of the lower surface adjacent to one rounded edge, to the said rounded edge, to the upper surface, to the opposite rounded edge, and to a portion of the lower surface lying adjacent to the said opposite rounded edge.

6. An article of manufacture comprising a flat, substantially rectangular central core panel formed with two of its opposite edges convex and smoothly rounded and the other two of its opposite edges substantially flat and having an upper surface and a lower surface, the said rounded edges being tangential to the said upper and lower surfaces, and a continuous sheet of decorative laminate bonded continuously to a portion of the lower surface adjacent to one rounded edge, to the said rounded edge, to the upper surface, to the opposite rounded edge, and to a portion of the lower surface lying adjacent to the said opposite rounded edge, and a strip of decorative laminate bonded to each flat edge.

7. A laminated article of manufacture including a central core panel formed with a convex smoothly rounded edge and having an upper and a lower surface, the said rounded edge being tangential to the said upper and lower surfaces, a bonding adhesive on said upper and said lower surfaces and said rounded edge, and a continuous sheet of decorative laminate extending over and in close contact with said upper and lower surfaces and said rounded edge and bonded to said central core panel by said bonding adhesive.

8. A laminated shelf including a flat, substantially rectangular central core panel formed with a convex, smoothly rounded leading edge and substantially flat side edges and having an upper surface and a lower surface, the said rounded edge being tangential to the said upper and lower surfaces, contact pressure bonding adhesive on said upper surface, said lower surface, said rounded leading edge and said flat side edges, a continuous sheet of decorative laminate extending over and in close contact with said upper and lower surfaces and said rounded edges, and a strip of decorative laminate extending over and in close contact with each said side edge, the said sheet and each said strip being bonded by said bonding adhesive to the core panel.

9. The process of forming a laminated article of manufacture, including a central core panel with a convex, smoothly rounded edge and a surface decorative laminate, said process comprising: applying an adhesive, smoothly adhering one surface of the core panel to the under surface of the decorative laminate with a portion of said decorative laminate extending beyond the rounded edge, heating that portion of the sheet of decorative laminate which is adapted to cover the smoothly rounded edge, forming and adhering the heated decorative laminate closely about the rounded edge, smoothly adhering the other surface of the core panel to the under surface of the decorative laminate, and closely adhering the decorative laminate to the core panel by substantially evenly applied pressure.

10. The process of forming a laminated article of manufacture, including a central core panel with a convex smoothly rounded edge and a surface decorative laminate, said process comprising: clearing the surface of the core of superfluous particles, spraying the core panel and the under surface of the decorative laminate with preheated contact cement, smoothly adhering one surface of the core panel to the under surface of the decorative laminate with a portion of said decorative laminate extending beyond the rounded edge, heating that portion of the sheet of decorative laminate which is adapted to cover the smoothly rounded edge, forming and adhering the heated decorative laminate closely about the rounded edge, smoothly adhering the other surface of the core panel to the under surface of the decorative laminate, closely adhering the decorative laminate to the core panel by substantially evenly applied pressure, and trimming the linear edges of the panel.

References Cited by the Examiner

UNITED STATES PATENTS

| | | | |
|---|---|---|---|
| 2,768,924 | 10/1956 | Wright | 161—43 |
| 2,835,623 | 5/1958 | Vincent et al. | 156—213 |
| 2,839,442 | 6/1958 | Whitaker | 156—213 |
| 2,859,061 | 11/1958 | Reid | 156—215 X |

MORRIS SUSSMAN, *Primary Examiner.*